United States Patent Office 2,842,206
Patented July 8, 1958

2,842,206

WATER SHUT-OFF METHOD

William G. Bearden and George C. Howard, Tulsa, Okla., assignors to Pan American Petroleum Corporation, a corporation of Delaware No Drawing. Application December 28, 1956
Serial No. 631,032

3 Claims. (Cl. 166—33)

This invention relates to a method for shutting off water entering wells. More particularly, it relates to shutting off water entering oil wells penetrating formations producing both oil and water. One method for shutting off water is described in U. S. Patent 2,032,826 to Ambrose et al. This patent teaches in general dissolving an oil-soluble, water-insoluble material in alcohol and injecting the solution into the water producing formation. In the formation, the alcohol solution is diluted by water which causes precipitation of part of the water-insoluble material. This precipitate tends to plug the water-bearing zone. If the solution enters an oil-bearing formation no harm is done for two reasons. First, there is little water present to dilute the alcohol solution and form a precipitate. Second, any precipitate which does form, rapidly dissolves in the oil.

Efforts to develop the Ambrose et al. technique have shown that the method operates very much as the inventors propose. That is, when a solution of naphthalene in methanol is forced into a water-bearing formation, mixing of water with the alcohol solution does occur, a precipitate is formed and the permeability of the water-bearing formation is decreased. The principal difficulties arise from two causes. First, the degree of the permeability decrease is small. This is due to the low solubility in alcohol of the plugging materials suggested by Ambrose et al. No great amount can be precipitated from the dilute alcohol solutions. As a result, it is difficult to obtain more than about a 50 percent reduction in permeability of most formations by use of a single treatment with the solution suggested by Ambrose et al. Furthermore, some of the materials, such as napthalene and stearic acid, have a slight water solubility. Therefore, they are slowly dissolved in the water and removed from the formation in the many weeks, months, or even years during which an oil well is normally produced.

If more alcohol-soluble and less water-soluble materials such as wood rosin are used in place of the naphthalene, stearic acid, and the like, of Ambrose, somewhat better results can be produced. Sometimes as much as 70 percent reduction in permeability can be obtained by treatment with reasonable quantities of plugging solutions. Such reduction in permeability is somewhat useful in shallow wells which produce little water. Such wells, however, do not present any great problem. The principal problem arises in wells which produce such a large volume of water that several thousand feet of water may stand in the hole. If such wells are treated with alcohol solutions of wood rosin, for example, a decrease of 60 or 70 percent in the permeability of the water formations may be produced. It will be apparent that less water would be produced through such a plugged formation if the same pressure differential was maintained between the formation and the bottom of the well. What actually happens, however, is that the level of liquid in the well is simply decreased until the pressure drop between the formation and the bottom of the hole is sufficient to cause production of the same amount of water as before—the capacity of the pumping equipment available. Under such circumstances, in order to obtain any considerable benefit from the plugging operation, the permeability of the formation must be reduced by at least 90 percent and preferably much more.

A considerable improvement on the Ambrose et al. process can be made by injecting into the water producing formation a solution of rosin polymers in a water miscible solvent. The polymers are preferably produced by the sulfuric acid polymerization of rosin dissolved in a solvent such as gasoline, benzene, carbon tetrachloride, or the like. The polymers and the method by which they are produced are described in more detail in U. S. Patents 2,017,866 to Morton, 2,108,928 to Rummelsburg, and 2,136,525 to Rummelsburg. The polymerization should be carried to such an extent that the average molecular weight of the resulting polymers is at least about 450, as measured in acetone, and the melting point, or more properly, the softening point, is at least about 100° C. by the ASTM ball and ring method. Preferably, the molecular weight should be about 500 and the softening point about 140° C. The higher softening point is, of course, highly important in treating formations having high temperatures. This process and the treating solution employed are described in more detail and claimed in co-pending U. S. patent application Ser. No. 631,277, filed December 28, 1956, by William G. Bearden, Robert P. Murphy, Jr., and Platho P. Scott, Jr.

The process and treating solution of Ser. No. 631,277 overcome the two principal difficulties of the Ambrose et al. process. We have now found, however, that three improvements are desirable even in the process of Ser. No. 631,277. First, a more uniform penetration of the treating solution into zones of varying permeability is desirable. Sometimes if a highly permeable zone is present together with zones having much lower permeabilities, the zones of lower permeabilities are plugged to a depth of only a few inches from the well. A zone should be plugged to a depth of several feet, preferably at least about 5 or 10 feet to form an effective shut-off for water flowing through the zone into the well. The problem is generally small since not much water can enter a well from a zone having a low permeability. In some cases, however, where low permeability zones are exposed to a well over a large depth interval, the problem can become troublesome. In addition, even narrow zones having permeabilities in the range of 100 millidarcys or more can produce large amounts of water. These may be ineffectively sealed if fractured zones, or those having much higher matrix permeabilities, are also present.

The second improvement desirable in the process of Ser. No. 631,277 is a more efficient precipitation of rosin polymers from the treating solutions injected into the formation. After injection of the treating solution into the formation, the direction of flow is reversed in that process to permit the water to penetrate the solution and precipitate the rosin polymers. When the direction of flow is reversed, some of the solution usually flows back into the well before sufficient water can penetrate and mix with the solution to cause any large degree of rosin polymers precipitation. A means for improving the degree of precipitation of rosin polymers in the formation would be desirable.

A third improvement considered desirable in the process of Ser. No. 631,277 is an even greater decrease in formation permeability than is provided by that process. By repeating the method, a greater degree of decrease of permeability can be obtained. However, the treating solution is rather expensive so a second treatment may be hard to justify. A greater decrease in permeability with the same volume of treating solution would often, of course, be advantageous. A means for controlling the degree of decrease would also be useful.

With the above problems in mind, an object of this invention is to provide an improved method for plugging water-bearing formations penetrated by the well. A specific object of this invention is to provide a water shut-off process which produces a more uniform penetration of treating solution into zones of different permeabilities. Another specific object of the invention is to provide a water shut-off method which will cause more efficient precipitation of plugging agent from the treating solution before this solution flows back into the well. A still further specific object is to provide a water shut-off procedure which will produce a very great decrease in the permeabilities of water producing formations penetrated by a well and will permit control of the degree of decrease.

In general, we accomplished the objects of our invention by interspersing small batches of water, either fresh or salty, within the treating solution during injection of the solution into the formation. That is, a small batch of treating solution is injected, then a small batch of water and so on, alternating batches of treating solution and water until the desired degree of plugging has been obtained.

The first batch of treating solution behaves the same as in the Ambrose et al. process or the method of Ser. No. 631,277. That is, the viscous solution forces most of the relatively low-viscosity water or oil in the formation ahead of it and permits little mixing of the water or oil with the treating solution. When the first batch of water is injected, however, this low-viscosity liquid easily penetrates and mixes with the treating solution, diluting it and throwing out of solution at least part of the rosin polymers as a precipitate. Since the batch of treating solution may be small, the injected water may easily penetrate completely through the batch.

The function of the process can best be understood by considering a linear rather than a radial system. In a linear system, the first batch of treating solution will penetrate the various zones of the formation to distances which are substantially directly proportional to the permeabilities of the zones. Thus, a zone with a permeability of 500 millidarcys may be penetrated to a depth of 2 feet while a zone having a 50 millidarcy permeability will be penetrated to a distance of only 0.2 feet or about 2.4 inches from the well.

The precent reduction in permeability in both zones will be approximately the same. Therefore, it might be expected that when the second batch of treating solution is injected, penetration will again be substantially proportional to the original permeabilities of the various zones. This has not been found to be the case, however. The explanation probably is that while the percent reduction in the permeabilities of both zones is the same in the first 2.4 inches, the less permeable zone is not plugged at all beyond this point. The permeability of the more permeable zone, on the other hand has been reduced greatly for an additional 21 or 22 inches. In the example given above, if the percent reduction in permeability is 90 percent, the permeability of the zone originally having 500 millidarcys permeability will be reduced to about 50 millidarcys for a distance of 2 feet away from the well. This is the same as the original permeability of the less permeable zone. Therefore, the second batch of injected treating solution will now enter the two zones at much more nearly the same rate. These zones will now have substantially the same permeability in the zone from about 2.4 to about 24 inches from the well.

The first batch of water, due to its low viscosity penetrates the first batch of viscous treating solution and has only a limited tendency to displace the viscous solution farther into the formation. The second batch of treating solution, on the other hand, usually is of substantially the same viscosity as the first. Therefore, this second batch of treating solution displaces the first batch now partially diluted with water, farther into the formation away from the well. Thus, at the end of the treatment, when as many as 5 or 6 batches of treating solution have been injected, each followed by water, the average total depth of penetration of treating solution into the formation is somewhat greater than the depth of penetration when the treating solution is injected alone. Penetration into permeable zones, however, is decreased, while penetration of the less permeable zones is greatly increased. In the technique which we propose, the depth of penetration into more permeable zones will still be greater than that into zones of lower permeabilities. This is as it should be, but the less permeable zones are plugged by this method to a distance from the well sufficient to form an effective barrier to flow of water to the well.

When flow is reversed after injection of all of the batches of water and treating solution, water flowing back through the water-producing zones further dilutes the batches of treating solution to precipitate even more of the rosin polymers. It will be apparent that this back-flow of water will be much more effective in diluting the first batch of treating solution which was injected since all water must pass through the zone occupied by this batch to reach the batches closer to the well. The last batch of treating solution injected may flow back to the well without contacting any water other than that in the batch of water which preceded it and followed it. For this reason, the sizes of the batches of water should be gradually increased during the process, the last batch of water possibly being several times larger than the final batch of treating solution. The first batch of water, on the other hand, may be smaller than the size of the first batch of treating solution. For example, the volume of this first batch of water may be as little as $\frac{1}{10}$ the size of the first batch of treating solution. Preferably, however, the volume of the batch of water should be at least $\frac{1}{2}$ that of the batch of treating solution which precedes it. Not more than about twice as much water as treating solution should be used for the first batch injected, however, so that some plugging agent will remain in the solution to plug the zones farther away from the well. It will be apparent that by use of this technique, much more effective use will be made of the last treating solution to enter the formation. A large percentage of the plugging agent is precipitated from even the last batch of treating solution injected into the formation. As a result of the more effective use of the plugging agent, a greater reduction in permeability of the water producing zones of the formation is achieved.

The method can be carried to any desired degree of permeability decrease. The degree of permeability decrease can be estimated from the increased difficulty of injecting alternate batches of treating solution and water. A water-bearing zone can be substantially completely plugged if desired. One case in which substantially complete water shut-off is required is in drilling wells using air as a circulating fluid. In such cases any large amount of water entering the well causes the bit cuttings to become wet and sticky. Thereupon, these cuttings tend to stick together as they are blown up the well, and form balls. These balls usually bridge between the drill pipe and well wall somewhere up the hole and may stick the drilling string in the well. In addition, these sticky masses greatly increase the difficulty of circulating air through the well. Our process can be used to plug off water-producing formations so that drilling can be continued with dry air.

Another specific application of the method is to waterflooding. In this method a large proportion of injected water may enter a highly permeable zone. The result frequently is that water flows readily through this zone from the injection to the producing well, bypassing most of the oil in less permeable zones. Our method can be used to plug the more permeable zones to a greater degree than the less permeable ones, and thus decrease the degree of bypassing which would otherwise occur. The method in this case is identical to that applied to a water-producing formation except that there is no back-flow step. A series of batches of treating solution is simply introduced into the stream of flooding water as it is pumped down an injection well. Small batches of water separate the individual batches of treating solution. Injection of flooding water is then continued as before.

Still another specific application of the process is to water-producing zones of oil wells. It might be supposed that the deliberate injection of water into the oil-bearing zone after a batch of plugging solution would cause the oil zone to be plugged to the same degree as a water-producing zone subjected to the same treatment. Such has not been found to be the case, however. Neither the treating solution nor the batches of water are able to displace all the oil from the oil-bearing zones. Thus, some residual oil permeability is always retained. As a result, when the well is returned to production after treatment, the oil flows through the oil-bearing zone, rapidly dissolving the precipitated rosin polymers from this zone. It has been found in the laboratory that even cores containing no oil can be cleared of plugging agent by forcing oil through them. The very small amount of permeability remaining is sufficient to permit a limited flow of oil. This flowing oil rapidly enlarges flow channels by dissolving plugging agent until substantially the entire original permeability of the core is restored. The same is also true of oil-bearing zones of formations penetrated by a well.

The method can also be used to plug gas zones of formations. If the gas zone contains no water, some water should be injected ahead of the first batch of treating solution.

From the above descriptions of possible applications of our method, it will be apparent that the terms "water-bearing zone" and "water-bearing formation" used herein should be interpreted broadly. They include formations producing water into a well either in the presence or absence of oil. They also include formations and zones into which water is injected from the well.

If rosin polymers are used, they may be produced in a single step of polymerization using long reaction times of 5 or 6 hours, high sulfuric acid concentrations of about 80 percent, in amounts equal to about 20 percent by weight of the rosin, and high reaction temperatures of about 50° C. Preferably, however, the polymerization should be carried out under much milder conditions to produce a smaller degree of polymerization with correspondingly decreased decomposition, isomerization, disproportionation, oxidation, and the like. The desired average molecular weight and softening point can then be produced by separation of at least part of the monomers away from the polymers. This separation may be accomplished by vacuum distillation, for example.

The polymers will generally contain some monomers as well as some rosin oils and the like. The term "rosin polymers" is intended to include this entire mixture of materials. Thus, when the average molecular weight and softening point of the rosin polymers are said to be 500 and 140° C. respectively, these values apply to the entire mixture and not to just the polymers present in the mixture. Likewise, when a rosin polymers concentration of 50 percent is mentioned, for example, the 50 percent refers to the concentration of the entire mixture of polymers, monomers, rosin oils and the like.

Due to the repetitive plugging action of our process, the degree of plugging in any one step need not be as great as in a single step process. Therefore, it may be found advisable to use unpolymerized rosin due to its lower price. The same degree of plugging can then be obtained by using a greater number of stages of treatment. If unpolymerized rosin is used, it may be gum rosin, wood rosin, tall oil rosin, or the like. It may be unmodified or modified by hydrogenation, disproportionation, isomerization, or the like. In general, however, the cost of the larger amount of solution required when using unpolymerized rosin offsets any price advantage of the rosin itself. Therefore, we greatly prefer the rosin polymers described above.

The nature of the solvent will depend to some degree on the nature of the plugging agent. Since the behavior of the unpolymerized rosin is similar to that of the rosin polymers, however, and since the rosin polymers are preferred, the solvent will be described with regard to the rosin polymers.

The solvent employed may be any liquid which is a good solvent for the rosin polymers, is oil-soluble, and is miscible in all proportions with water. The solvent should be able to form solutions of the polymers containing at least about 40 percent by weight of the polymers. This is because solutions containing smaller concentrations of the polymers do not form sufficiently effective plugs in water zones. An effective plug should produce at least 90 percent reduction in permeability of the water-bearing zones by a single batch of treating solution. Solutions containing up to 60 percent by weight of the polymers may be used in some cases. Such solutions, however, are very viscous and are difficult to pump into formations, particularly those having relatively low initial permeability. If such solutions are used, obviously the solvent must be capable of dissolving sufficient rosin polymer to form solutions containing up to about 60 percent by weight of the polymers.

The solvent must be oil-soluble so that it will be dissolved by oil flowing to the well and thus be removed from the formation. Otherwise, a permanent emulsion might be formed. For purposes of our process, the solvent should have a solubility of at least about 1 part of the solvent in about 10 parts of oil. A greater degree of solubility is desirable and complete miscibility in all proportions is preferred.

Water and the solvent should be completely miscible in all proportions to insure that there will be no limit on the degree of dilution of the rosin polymer solution by water in the formation. Otherwise, the degree of precipitation of polymers from the solution might be undesirably limited.

The two specific solvents which have been found to be most suitable for our purposes are methanol and isopropanol. Methanol is the least expensive and forms concentrated solutions having somewhat lower viscosities than solutions of rosin polymers in other solvents such as isopropanol. However, methanol solutions are frequently turbid due to the presence of undissolved solids. This is particularly true for solutions containing less than about 50 percent by weight of the rosin polymers. In addition, methanol solutions are very sensitive to water. That is, small amounts of water cause precipitation of some of the polymers. In most cases, a little turbidity of the solution due to undissolved or precipitated solids is not objectionable. However, such solids do tend to plug the pores of formations, decreasing their permeability, and increasing the difficulty of injecting the water shut-off solutions into the formations.

Isopropanol generally forms clear solutions of rosin polymers even at low concentrations of the polymers. In addition, isopropanol solutions are not so sensitive to small amounts of water. About 10 percent water can be added to isopropanol solutions of rosin polymers before precipitation of the polymers begins. However, the isopropanol solutions are considerably more viscous than solutions of the polymers in methanol and are, for this reason, more difficult to inject into formations.

A preferred solvent contains a mixture of methanol and isopropanol. In the treating solution, at least about 10 percent by weight methanol should be present to decrease the viscosity of isopropanol solutions to no more than about 100 centipoises. At least about 10 percent by weight of isopropanol should be present to produce clear solutions. The concentration of rosin polymers should be between about 40 and about 60 percent by weight. A preferred composition contains about 32 percent methanol, about 23 percent isopropanol, and about 45 percent rosin polymers. The preferred range of compositions containing methanol, isopropanol, and rosin polymers is described in more detail and is claimed in co-pending U. S. patent application, Serial No. 631,277.

Alcohols other than methanol and isopropanol can also be used. For example, the rosin polymers dissolve in ethanol to form solutions having viscosities in the range between similar solutions in isopropanol and methanol. Ethanol is somewhat less desirable than methanol and isopropanol for three reasons. First, commercial ethanol contains at least about 5 percent water. This leads to poor solubility of some of the rosin polymers. Therefore, the solutions of the rosin polymers in commercial ethanol are likely to contain even more solids than methanol solutions and also are usually more water sensitive. Second, commercial ethanol usually contains denaturants which may be objectionable in our process. In addition, ethanol is subject to close governmental regulations which may greatly complicate use of the material. Third, commercial ethanol is much more expensive than methanol and is generally somewhat more expensive than isopropanol. While ethanol is operable as a solvent in our process, its use is not preferred for the above reasons. Other alcohols such as normal propanol, tertiary butanol, the monomethyl ether of ethylene glycol, and the like, are also available which are miscible with water in all proportions, oil-soluble, and are good solvents for rosin polymers. Such alcohols are also operable for our purposes but are not preferred. This is principally because of their higher cost. In addition, they usually form solutions having higher viscosities than those prepared using the lower molecular weight alcohols.

A few non-alcoholic solvents such as acetone and dioxane, can also be used to prepare rosin polymers solutions suitable for our purposes. High water sensitivity, turbidity of solutions of the rosin polymers in such solvents and high cost normally exclude these from the preferred group.

Mixtures of the above solvents with each other can be used if desired. In addition, special solvents, for example, other alcohols such as amyl alcohol, ethers such as diethyl ether, esters such as ethyl acetate, ketones such as methyl ethyl ketone, and the like, which are not completely miscible in all proportions with water, can also be used in small amounts mixed with the completely water-miscible solvents. Such special solvents must be slightly water-soluble and should be used only in amounts which will cause the mixed solvents to be completely water miscible in all proportions. These special solvents are useful in decreasing water sensitivity of solutions of the rosin polymers in some solvents such as methanol, and in clarifying solutions which are turbid due to the presence of undissolved polymers. When the term "consisting essentially of" is used hereinafter in connection with the definition of a composition, the term is intended to include compositions containing, in addition to the principal components, other ingredients such as the solvents described above, in amounts which do not affect the properties of the composition in a manner and to a degree adverse to the intended use of the composition.

Preparation of solutions of the rosin polymers in solvents presents a problem. Normally, when a treating solution includes a solvent such as methanol which is readily available locally, it is customary to mix such a solvent with the solute at the well to save freight charges on shipment of the solvent from the source of the rosin polymers. It has been found, however, that even if the rosin polymers are ground to pass a ½-inch screen, the rate of solution in solvents is slow. For example, 8 to 12 hours may be required to dissolve the rosin polymers in a mixture of methanol and isopropanol by use of a propeller-type stirrer in a tank containing the polymers and solvent. Generally, it is undesirable to tie up equipment at a well for this length of time while performing a mixing operation. The solution rate is increased by heating but this introduces a fire hazard and the advantage is not great until the softening point of the polymers is reached. Since this temperature is far above the boiling point of most of the desirable solvents, pressure equipment, not usually available in the field, is required. It is also possible to ship a primary solution to the field where it can be diluted. Since the concentration of polymers in the desired treating solution is so high, however, and viscosities of more concentrated solutions are extremely high, this has not seemed to be a very practical method.

Although any of the above techniques may be employed to prepare water shut-off solutions in the field, it is generally preferred to prepare the solutions in the manufacturing plant where the rosin polymers are made, or at a central point near fields containing wells to be treated. This solution is then shipped to the well in drums or tank trucks ready for use.

Unpolymerized rosin dissolves only partially in methanol at ordinary temperatures. The remaining solids should generally be removed by settling and decanting, filtration, or similar means to avoid plugging the face of the formation when the treating solution is injected into the formation. It is possible, however, to use such solutions without removal of undissolved solids. An advantage of using isopropanol as a solvent is that this alcohol is a much better solvent for the unpolymerized rosins. For example, when 60 parts by weight of wood rosin are agitated with 40 parts by weight of isopropanol, little, if any, undissolved solids remain. When the composition contains larger proportions of unpolymerized rosin, complete solution does not usually occur. Removal of undissolved solids is, therefore, generally advisable.

The quantity of solution used depends principally upon the length of exposed formation to be treated. Use of about 50 gallons per foot of exposed formation is recommended. That is, if 10 feet of formation is exposed between depths of 1,000 and 1,010 feet, about 500 gallons of water shut-off solution should usually be injected. The amount should be at least about 10 or 20 gallons per foot of exposed formation to insure an adequate distance of penetration into the formation to produce an effective plugging action. Use of more than about 100 gallons per foot becomes economically prohibitive in view of the small advantage of using such large volumes over the results produced by volumes less than about 100 gallons per foot. Nevertheless, in some cases use of larger volumes may be justifiable. The total volume should be increased about 1½ to 2 times if an unpolymerized rosin is used as the plugging agent.

The total quantity of treating solution must be divided into at least 2 batches if the improved penetration into less permeable zones is to be obtained. Preferably, the solution should be divided into from about 3 to about 5 or 6 batches if the rosin polymers are used as the plugging agent. The number of batches should be from 2 to about 10 or 12 if an unpolymerized rosin is used.

Either the total volume of treating solution or the number of batches into which the treating solution is divided, or both, may be increased in some cases. The adaptability of the method to wells having different requirements is one of the advantages of the method. It is possible to start pumping alternate batches of treating solution and water down the tubing and simply continue pumping them down until the permeability of the exposed formation is decreased to the desired degree. This will be indicated by the rate of flow and the required injection pressure. This process, of course, leaves the tubing full of treating solution and water which must be circulated out of the well. An oil, such as kerosene, crude petroleum, or the like, should be used as the circulating fluid in such cases, to avoid excessive precipitation of the plugging agent in the annular space between the tubing and casing.

Circulation of treating solution out of the tubing can usually be avoided by watching the drop in injection rate and increase in injection pressure when the first batches of treating solution and water reach the formation. From these values an estimate of the total batches required can usually be made. It is also possible to inject arbitrarily 2 or 3 batches of treating solution, each followed by water. After the final batch of treating solution is introduced into the tubing it may be followed down by sufficient water to fill the tubing. Thus, if the 2 or 3 batches are sufficient, the tubing is filled with water only. If the 2 or 3 batches of treating solution do not produce the desired degree of plugging, another batch or 2 or 3 can be injected, the water in the tubing being either circulated through a circulating port into the casing or displaced into the formation.

Some advantages are to be obtained in a single batch treatment using our method. This method comprises injecting the entire quantity of treating solution and forcing the solution into the formation by a batch of water. This method does not produce the more uniform penetration of all zones, which is characteristic of the multiple batch method. It does, however, make effective the last portion of injected treating solution. The water following the treating solution into the formation dilutes the solution and precipitates the plugging agent. Back-flow of water need not be relied on to precipitate plugging agent from this last portion of injected treating solution. Therefore, there is little possibility for undiluted treating solution to flow back into the bore when the well is returned to production. A much more efficient plugging action thus results. It is greatly preferred, of course, to divide the treating solution into several batches, each batch being followed by water into the formation to take full advantage of the more uniform plugging ability of this method. Either the single-batch or the multiple batch process can be repeated to obtain additional plugging.

Certain mechanical precautions should be observed. For example, treatment should normally not be attempted down the annulus between the casing and tubing unless the well is first pumped down to a very low level. Usually, this will not be possible in wells producing large volumes of water. Generally, the solution should be introduced down tubing with a packer or retainer set between the tubing and casing to isolate the treating solution from liquids in the annular space above the zone to be treated. A packer may also be set below the zone to be treated. Use of two packers to isolate a zone only 10 or 20 feet long is particularly advisable if a long section of formation is exposed. That is, long sections should preferably be treated about 10 or 20 feet at a time. As previously mentioned, the treating solutions are viscous so the rate of injection should be controlled to avoid developing pressures sufficient to fracture the formation.

A special problem exists in getting the alternate batches of water and treating solution down the tubing. The treating solution, being much more viscous than the water, forces water ahead of it with very little mixing. When water follows the treating solution, however, more mixing occurs. The degree of mixing is surprisingly small, probably for the same reason that little mixing of adjacent batches in pipelines is noted. Thus, the batches of water and treating solution can be pumped alternately down the tubing without spacers or separators, if desired. It is preferred, however, to separate the water and treating solution, particularly when water follows the treating solution. Separation can be achieved by use of a small volume of solvent such as an alcohol, ketone or the like between the water and treating solution. An oil, such as kerosene, may be also employed. Enough solvent to fill from about 1 to 5 feet of tubing should ordinarily be used although more may be employed if desired. The solvent not only acts as a physical barrier between the water and treating solutions but also dilutes the plugging solution, thus decreasing its sensitivity to water contamination. Solid plugs may also be used to separate the water and treating solution. These plugs may be made of rubber, neoprene, polyethylene, or the like. Preferably they should be made of an oil-soluble material such as paraffin or naphthalene or a water-soluble material such as sodium chloride or solid ethylene oxide polymers.

Our invention will be better understood from consideration of the following examples:

EXAMPLE I

A core about 3½ inches in diameter and 28 inches long was cut from the Berea sandstone parallel to the bedding planes. The core was sealed in a metal pipe with Woods metal. The core was then saturated with brine containing 3 percent sodium chloride by injecting the brine into one end of the core while applying a vacuum to the other end. When the core was saturated with water its permeability to flow of water was determined. A plugging solution was injected into the core in a direction opposite to the direction of the flow of water to simulate as closely as possible the conditions when treating a formation producing water into a well. The treating solution was preceded by a small volume of kerosene since this step has been found to be advantageous in some cases. When the desired penetration of treating solution was attained, a small volume of water was injected after the treating solution. The direction of flow was then reversed and brine was again injected from the same direction as before. This flow was maintained until stabilized conditions were noted. The final permeability was then determined to permit calculating the percent reduction in permeability. The volumes of liquids used in the treatment and the results of the method are presented in Table 1. The plugging agent used was rosin polymers which had been subjected to vacuum distillation to raise the average molecular weight to about 500 and the softening point to about 140° C. The treating solution consisted of 45 percent by weight of these rosin polymers, 32 percent by weight methanol, and 23 percent by weight isopropanol.

*Table 1*

| | |
|---|---|
| Original permeability, millidarcys | 140 |
| Treatment volumes: | |
|    Kerosene antecedent, percent pore volume | 10 |
|    Treating solution, percent pore volume | 60 |
|    Water, percent pore volume | 20 |
| Stabilized permeability after backflow, md | 2.2 |
| Permeability reduction in invaded zone, percent | 98.4 |

The volume of water injected into the core after the treating solution was only ⅓ of the volume of the treating solution. Nevertheless, when backflow was initiated, very little undiluted treating solution was observed to flow out of the core. The very high degree of permeability reduction can be attributed to the improved dilution of treating solution by the small batch of water following the treating solution into the formation.

EXAMPLE II

To test the ability of the multi-stage treatment to cause more uniform penetration of less permeable zones of a formation, 4 separate permeable test cells were prepared by pouring slurries of cement, sand and water into sections of 2-inch pipe about 28 inches long. For convenience these test cells will be referred to as cores. One core was made of neat cement. The other 3 contained sand in various ratios to cement. The sand/cement ratios were 5/1, 10/1, and 20/1. The core formed with a 10/1 ratio was faulty and was discarded during the test. Only the results with the other 3 cores will be considered. The neat cement core had a very low matrix permeability like many limestones. In order to further simulate limestone formations, this neat cement core was fractured by beating the pipe holding the core. A large hammer was used for this operation. The 4 cores were connected to a manifold formed by 2-inch T's and nipples. The manifold was vertical, simulating a well, and the cores extended horizontally from the manifold, one above the other, simulating formations penetrated by a well. A valve was placed on the bottom of the manifold to permit draining. The original permeability of each core was tested by injecting water under 70 p. s. i. g. into the core from the outer end and measuring its rate of flow into the manifold. The original pore volumes of the unfractured cores were determined by casting small samples of the mixes used in forming the cores and determining the pore volumes of these small samples by the standard Bureau of Mines method using air. The pore volumes of the cores were then calculated. The pore volume of the fractured core was assumed to be about 30 percent since this is slightly more than the normal porosity of neat cement. The corresponding total pore volume was calculated from this value. Before the actual plugging operation was started, kerosene was injected into the manifold and into the cores to simulate the effects of the presence of oil in a well and in the formations. The kerosene was drained from the manifold which was then filled with the treating solution described in Example I. This solution was forced into the cores under a pressure of 200 p. s. i. g. The amount of treating solution entering each core was determined by measuring the total fluid displaced from the outer end of each core. After sufficient solution had been injected to fill the most permeable core substantially completely, the solution was drained from the manifold which was then filled with water. Water was injected at about 900 p. s. i. g. The volume of this first batch of water was about half the volume of the first batch of treating solution. Water was then drained from the manifold and a second batch of treating solution was injected at 300 p. s. i. g. This was followed by a second batch of water injected at 600 p. s. i. g. Finally, a third batch of treating solution was introduced at 900 p. s. i. g. Water was then forced into the outer ends of the cores to simulate backflow of water through treated formations. When the rates of flow had reached stable values, permeabilities were again measured. Some of the results are presented in Table 2.

*Table 2*

| Core No. | Volume Plugging Solution, ml. | | | Total | Pore Vol., ml. | Percent Pore Vol. Filled |
|---|---|---|---|---|---|---|
| | 1st Batch | 2nd Batch | 3rd Batch | | | |
| 1 | 10 | 8 | 325 | 343 | 437 | 78.5 |
| 2 | 550 | 37 | 170 | 757 | 583 | 130.1 |
| 3 | 32.5 | 7 | 225 | 264.5 | 510 | 51.8 |

It will be apparent that the 3-stage process produced a much better penetration of the less permeable zones than would have been produced by a single stage method. More than 50 percent of one of the less permeable cores and almost 80 percent of the other was filled with plugging solution. A comparison to the quantities entering each zone when the first batch was injected indicates the improvements afforded by the method. A still better idea of the improvement in uniformity of injection is apparent in Table 3.

*Table 3*

| Core No. | Percent of Batch of Plugging Solution in Each Core | | | |
|---|---|---|---|---|
| | 1st Batch | 2nd Batch | 3rd Batch | Total |
| 1 | 1.7 | 15.4 | 45.1 | 25.1 |
| 2 | 92.8 | 71.1 | 23.6 | 55.5 |
| 3 | 5.5 | 13.5 | 31.3 | 19.4 |

This table presents the percent of each batch of plugging solution entering each zone. For example, core 2, the most permeable one, took 92.8 percent of the first batch but only 23.6 percent of the third batch. Core 3, on the other hand, took only 5.5 percent of the first batch but 31.3 percent of the third batch. Core 1 was the fractured, neat cement one. Its behavior was somewhat different from the others, but, here again, a core with low initial permeability took a very small percent of the first batch of plugging solution but a very large percent of the final batch.

The overall plugging ability of the multi-stage process is indicated by the data in Table 4.

*Table 4*

| Core No. | Permeability to Water Flow, md. | | |
|---|---|---|---|
| | Original | Final | Percent Reduction |
| 1 | 330 | 2.43 | 99.27 |
| 2 | 9,400 | 5.20 | 99.94 |
| 3 | 469 | 0.37 | 99.92 |

These data show that the permeabilities of all cores were reduced by at least 99 percent. In two cases, the reduction exceeded 99.9 percent. Even if a formation has a very high permeability, when this permeability is reduced by 99.9 percent, it will be apparent that additional plugging solution will then enter the zones originally having lower permeabilities. This is generally accomplished by increasing injection pressures as in the present test. The data also illustrate the superior ability of the multi-stage treatment to produce the almost complete elimination of permeability required for some purposes.

No effort was made to clear the rosin polymers from these particular cores by flowing oil through them. However, many other cores plugged to approximately the same degree have been returned to substantially their original permeability by this method.

Consideration of the foregoing description and examples shows that we have accomplished the objects of our invention.

We claim:

1. A method for plugging a water-bearing formation penetrated by a well comprising injecting into said well and then into said formation a treating solution containing from about 40 to about 60 percent by weight of a plugging agent selected from the group consisting of rosin and rosin polymers in an oil-soluble solvent for said plugging agent, said solvent being miscible in all proportions with water, displacing said treating solution into said formation with a separate volume of water equal to at least about 1/10 the volume of treating solution, and displacing said volume of water into said formation with at least one additional batch of treating solution followed by water whereby more uniform penetration of treating solutions into zones of differing permeabilities is obtained.

2. The method of claim 1 in which said plugging agent is produced by the mild sulfuric acid polymerization of rosin followed by vacuum distillation to remove sufficient monomers to increase the molecular weight of the remaining polymers to at least about 450 and to increase the softening point of the remaining polymers to at least about 100° C.

3. The method of claim 1 in which said solvent is selected from the group consisting of aliphatic alcohols containing from 1 to 3 carbon atoms per molecule and mixtures thereof.

References Cited in the file of this patent

UNITED STATES PATENTS

| | | |
|---|---|---|
| 1,317,462 | Swan | Sept. 30, 1919 |
| 2,296,952 | Ross et al. | Sept. 29, 1942 |
| 2,348,484 | Lawton | May 9, 1944 |
| 2,779,416 | Clark | Jan. 29, 1957 |

OTHER REFERENCES

Hackh's Chemical Dictionary, 3rd edition, 1944, p. 743.